United States Patent Office 3,115,036
Patented Dec. 24, 1963

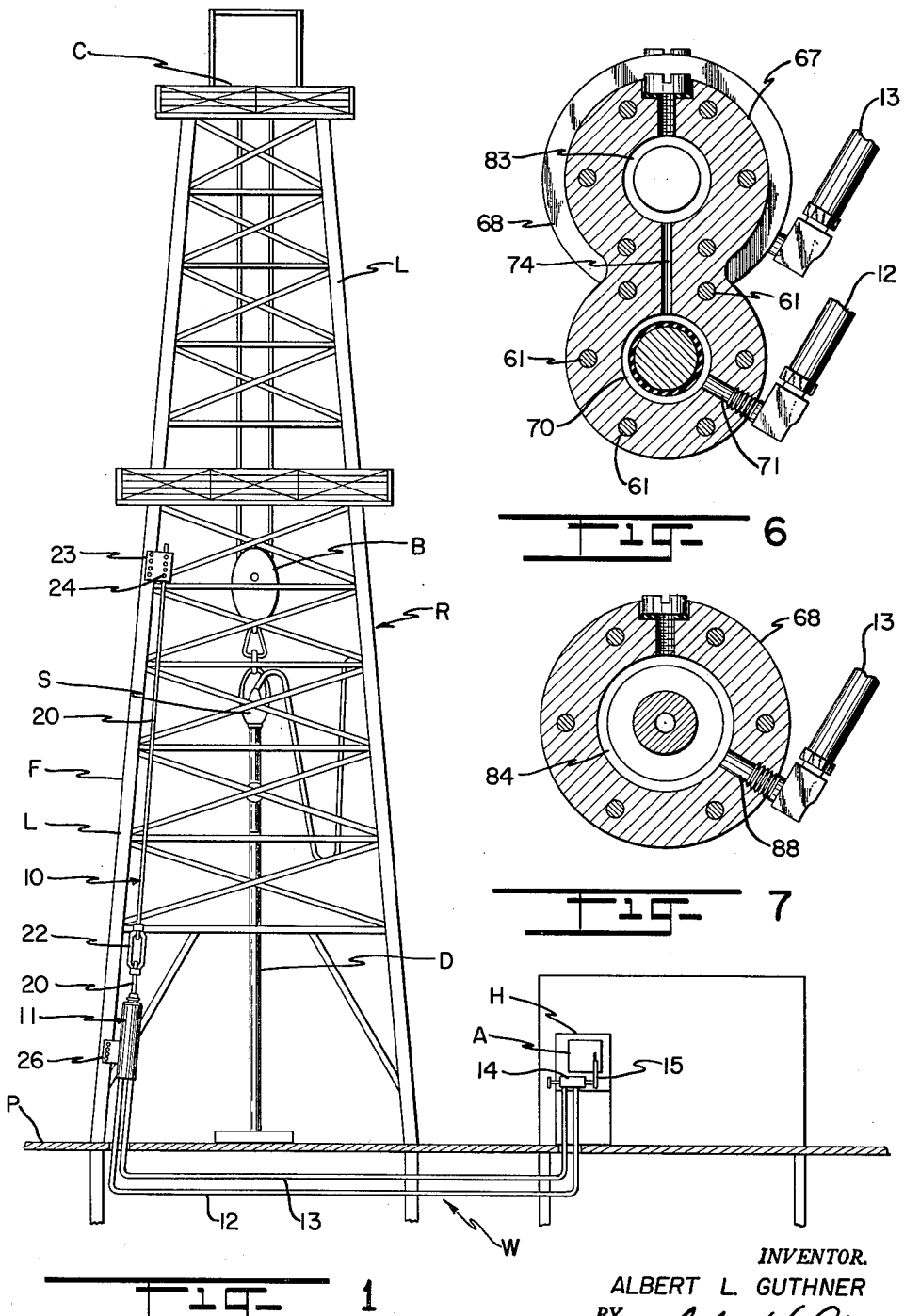

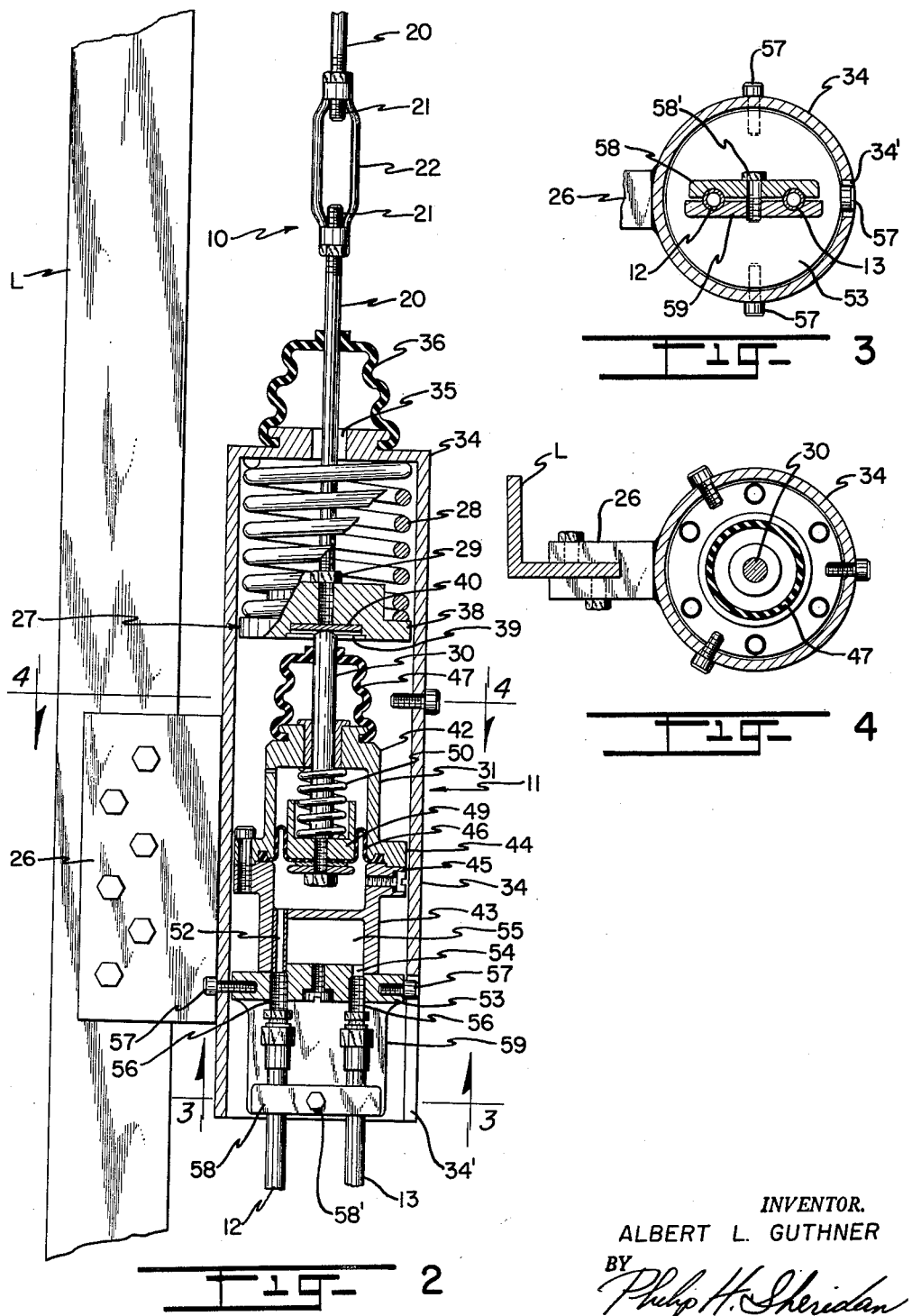

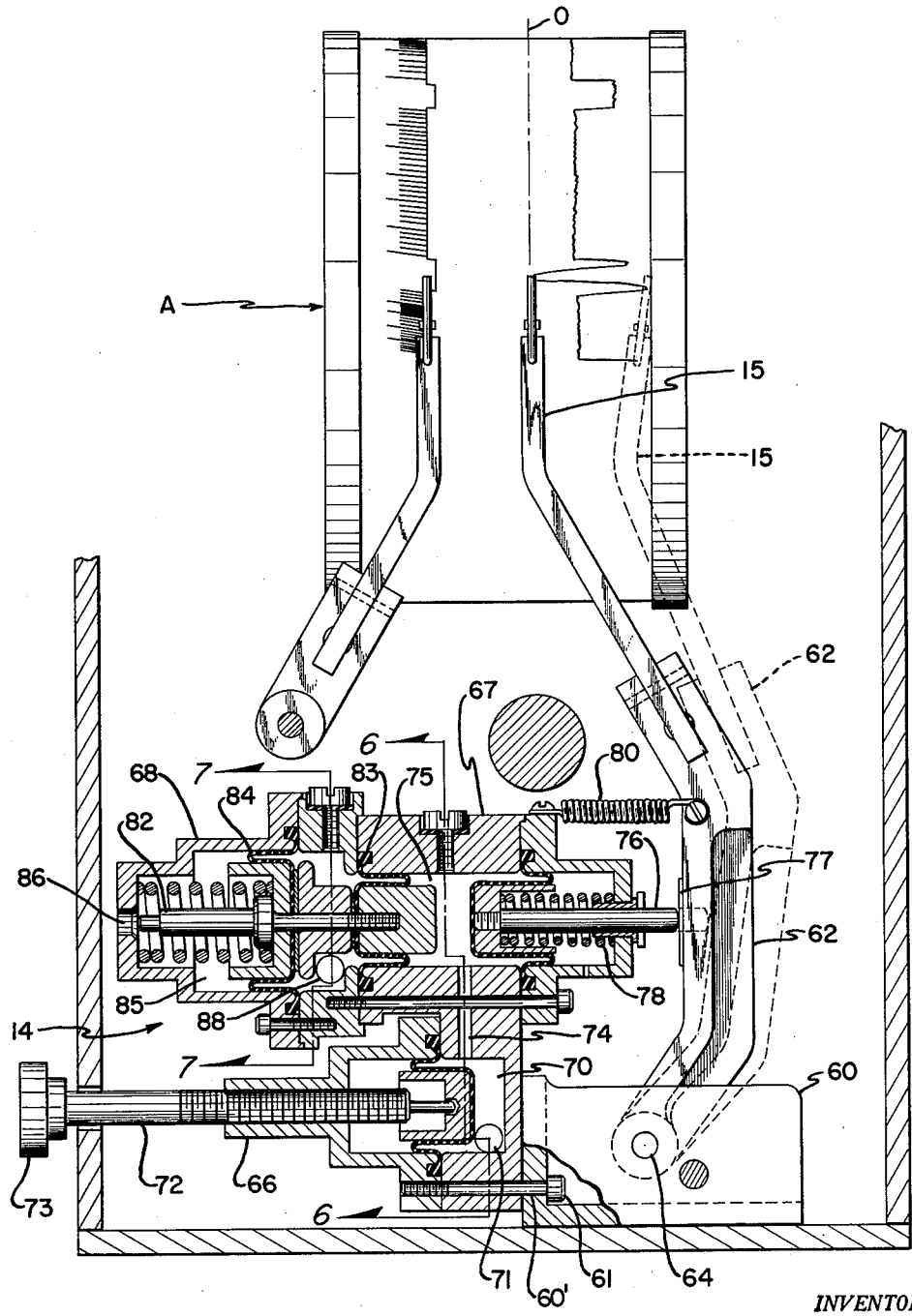

3,115,036
WEIGHT RECORDING APPARATUS
Albert L. Guthner, Englewood, Colo., assignor to Eastman Oil Well Survey Company, Denver, Colo., a corporation of Delaware
Filed Feb. 1, 1960, Ser. No. 5,877
3 Claims. (Cl. 73—151)

This invention relates to a novel and improved weight recording apparatus which is adaptable for measuring variations in weight applied in the form of a downward thrust to a drill rig.

In the earth bore drilling art, it is customary to record the various drilling activities which take place, such as, the rate of penetration together with operations carried out during non-drilling intervals, such as for example, adding sections of drill pipe, reaming or changing of the drill bit; and, in present day practice these operations are capable of being recorded through the use of a single pen or pair of recording pens mounted to scribe the various activities on a movable chart holder. For example, a typical apparatus which is designed for recording through the use of a pair of pen instruments the activities which take place is that shown and described in the patent to Oliver V. Phillips, No. 2,860,509, patented November 18, 1958. More recently, among the activities which are desirably recorded is the variation in weight supported by the draw works on the drill rig as the drilling operations progress, and the present invention is directed to a greatly improved weight recording apparatus which enables accurate, sensitive and continuous measuring of the variations in weight applied to the drilling rig as the drilling operation progresses.

It is accordingly a principal object of the present invention to overcome many of the disadvantages and drawbacks of prior art weight recording apparatus by provision for an accurate, highly sensitive and continuous means of measuring and recording variations in weight, however slight, which are applied during well drilling.

It is another object of the present invention to provide for an improved weight recording apparatus which employs a minimum number of parts, is rugged and simplified in operation.

It is a further object to provide for a weight recording apparatus which is conformable for incorporation into existing recording apparatus, is easy to install and operate in the field and may be left intact throughout the drilling operation, and which further provides an accurate and highly sensitive means of measuring weight variations in such a way as to avoid any loss of accuracy due to factors such as friction in the various parts of the rig and recording apparatus itself; and moreover, enables convenient installation on the drilling rig so as not to interfere with normal drilling operations or necessitate periodic removal of the weight recording elements at any time, as drilling progresses.

It is a still further object to provide for a novel and improved weight recording apparatus which is adaptable for connection directly to any portion of the rig or other part which exhibits predictable variations in characteristics such as strain, elongation or compression in response to varying applications of weight to the drilling rig and wherein the recording apparatus is capable of establishing an accurate way of translating such weight variations into a signal highly sensitive to such variations for recording on a chart; and more specifically to provide for recording apparatus which is responsive to changes in length at a portion of the rig due to variations in the load applied to the draw works so as to transmit a corresponding signal for continuous recording of such weight variations.

It is an additional object to provide for a weight recording apparatus which is capable of being adjustably mounted and connected into presently available forms of recording instruments, in such a way that the sensitivity of the weight recording apparatus may be varied in accordance with the amount and variation in weight to be encountered and which is further directly responsive to variations in weight without the necessity of first overcoming any friction in the system.

In accordance with the above, the present invention is comprised essentially of a measuring element which is connected in a unique manner to a portion of the rig which undergoes predictable changes in length in accordance with varying weights applied in the form of a downward thrust through the rig and wherein the measuring element includes at one end thereof a force-applying member which is movable in response to changes in length of the rig portion to develop a corresponding signal which is transmitted for actuating a recording pen or similar instrument, the latter being adjustable to accurately correlate the movement of the force-applying member with the variation in weight applied to the rig.

The above and other objects and advantages of the present invention will become more apparent from the following detailed description taken together with the accompanying drawings, in which:

FIGURE 1 is an elevational view illustrating the manner of connection of a preferred form of weight recording apparatus to the drill rig in accordance with the present invention;

FIGURE 2 is a detailed view, partially in section, showing a portion of the measuring and transmitting sections of the preferred form of weight recording apparatus, in accordance with the present invention;

FIGURE 3 is a cross-section view taken on line 3—3 of FIGURE 2;

FIGURE 4 is a sectional view taken on line 4—4 of FIGURE 2;

FIGURE 5 is a detailed view, partly in section, showing the receiver and recording sections of the preferred embodiment of the present invention;

FIGURE 6 is a cross-sectional view taken on line 6—6 of FIGURE 5; and

FIGURE 7 is a sectional view taken on line 7—7 of FIGURE 5.

Referring more particularly to the drawings, there is shown by way of illustrative example in FIGURE 1 a drill rig R including in general a main supporting frame or derrick F including legs L extending upwardly from the drill platform, a crown C from which there is suspended a pulley line and travelling block B, and a swivel S connected to the travelling block and a drill stem D together with a fluid pumping line leading into the drill stem. In addition, shown located on the drill platform to one side of the derrick is a recording apparatus including a housing H for various recording instruments and apparatus including a recording chart indicated at A, a typical illustration of such apparatus being set forth in the patent to Phillips, No. 2,860,509. Of course, the foregoing description is directed to a conventional drilling rig which is merely representative of various forms of drilling apparatus to which the weight recorder of the present invention has relation, and accordingly it is to be understood at the outset that the weight recorder to be described is conformable for use with virtually any type of earth boring apparatus and recording apparatus, either presently known or which may be devised in the future.

As generally indicated in FIGURE 1, the weight recording apparatus W of the present invention includes a measuring section 10 and transmitter 11 connected to one leg of the derrick with fluid delivery and compensator lines 12 and 13, respectively, shown leading from the transmitter into a receiver 14 which is mounted in the housing for the recording apparatus in association with a recording pen 15 disposed for scribing on the chart A. Essentially, the manner of mounting the measuring system in direct connection to one of the legs L of the derrick is based on the principle that any variations in weight applied to the drill rig, such as, through the crown or traveling block will be reflected by a change in length of the respective leg either in elongation or in compression as the weight decreases or increases respectively. Usually, the legs L are composed of angle iron frame members which are readily responsive to any changes in weight applied thereto to either increase or decrease in length at least to an extent such that a sensitive measuring unit may be employed in direct connection thereto to sense such changes in length. In addition, since it is highly desirable to provide a rapid and continuous reading of the variations in weight as measured through the length variation of the leg, the manner of mounting the measuring section and translating such measurements in the form of a signal to the recording pen is highly important so that accurate recordings may be taken which are directly in proportion to such changes in length in the leg. Accordingly, the weight recorder W of the present invention is constructed and disposed in relation to the drilling rig so as to be directly responsive to any such minor variations in weight for simultaneous translation into a signal transmitted directly into the receiver, the receiver in turn being operative to actuate the scribing pen 15, and in doing so, to employ a minimum number of parts which require a minimum of maintenance, and also eliminate the necessity of periodic removal from the rig.

As best seen from FIGURES 1 and 2, the measuring section 10 is preferably comprised of a force-applying member defined by a wire cable or tie rod 20, and in the latter event the tie rod may be comprised of a pair of rod portions having adjacent threaded ends 21 which are adjustably secured together by means of a turnbuckle 22. The upper end of the tie rod is shown attached in parallel spaced relation to an intermediate portion of the leg L by means of an anchor plate 23 having a series of vertically spaced openings 24 therein which are adapted to receive the upper hooked end of the tie rod. In turn, the lower end portion of the tie rod 20 extends downwardly from the turnbuckle 22 for projection into the transmitter assembly 11, the latter being rigidly mounted to the lower end of the leg unit L by means of a lower anchor plate 26 secured by suitable bolt members to the side of the leg. It will be apparent that the force applying member may be preloaded either under tension or compression although when a cable or tie rod is employed it is mounted under tension. For example, the lower end of the tie rod is shown having a plunger portion 27 which is biased downwardly by means of a coiled spring unit 28 interposed between the plunger and one end of the transmitter assembly. Of course, to regulate the desired amount of tension to be applied to the tie rod in its initial relation to the leg unit L, the turn buckle 22 is provided for such adjustment and also the plunger portion 27 is made threadedly adjustable upon the lower end of the tie rod so that the extent of inward movement of the plunger acting against the tensioning of the spring unit 28 may be controlled through adjustment of the nut 29. In this relation, it will be noted that any decrease in length of the leg unit between the anchor plates 23 and 26 will cause a downward or outward movement of the plunger 27 in relation to the rigidly secured transmitter assembly 11; conversely, increases in length will cause an opposite upward movement of the plunger against the bias of the spring and throughout movement in either direction it will be appreciated that any backlash or play in the system is eliminated by initially mounting the measuring section under tension.

The transmitter assembly 11 is constructed and arranged in relation to the measuring section for the purpose of being directly responsive to movements of the plunger to transmit a signal proportional to such movements directly into the receiver assembly 14 for actuating the scribing pen. To this end, the assembly 11 is broadly comprised of piston 30 which is slidable through a cylinder 31 in response to movement of the plunger to control the delivery and return of a fluid force in the cylinder through the flow line 12.

In the preferred form, the transmitter assembly 11 is made up of an outer cylindrical container 34 forming a common enclosure for the lower end of the tie rod 20, plunger 27 and spring unit 28, together with the cylinder and piston arrangement forming the transmission assembly proper. An opening 35 is provided in the upper end of the container 34 to permit downward projection of the tie rod 20 therethrough and to seal the container 35 in relation to the tie rod a rubber-like convoluted seal 36 is resiliently mounted at the top of the container to permit free working of the tie rod through the upper end of the container. The plunger element 27 is of a generally cylindrical configuration having an outwardly projecting shoulder portion 38 which serves as the lower limit of movement for the spring 28 the latter being compressed between the plunger 27 and top of the container; and, in addition the plunger includes an annular groove portion 39 at its lower end in which is disposed a hardened metallic seat 40 which is positioned for direct engagement with the piston 30.

The transmitter assembly may be of any conventional form and is preferably of the type as shown in which the piston acts in response to movement of the plunger to control the output of hydraulic fluid. Broadly, the entire assembly is mounted in inner concentric relation in the lower end of the container 34, and the cylinder is made up of chambers 42 and 43 having mating interconnecting rim portions 44 and 45 between which is sealed the enlarged peripheral end of a flexible diaphragm 46 secured to the lower end of the piston. The upper end of the cylinder is provided also with a convoluted seal 47 and the piston 30 projects upwardly through the seal into engagement with the seat 39 of the plunger. In addition, the lower end of the piston includes an enlarged head portion 49 which is biased in a downward direction by spring 50, and the piston is accordingly normally biased to set through the diaphragm 46 directly against the fluid, not shown, in the lower chamber 43. From the chamber 43 a delivery duct 52 extends downwardly through a connection plate 53, forming the bottom of the cylinder into the flow line 12.

The compensator line 13, which is included for a purpose to be described, communicates with a compensator duct 54 at the lower end of the cylinder, the latter opening into a separately formed reservoir 55 in the lower end of the chamber 43. To mount the plate 53 in proper relation at the lower end of the chamber 43 a series of connecting screws 56 may project laterally through the container 34 into openings provided in the side of the plate 53, one of the screws being adapted for insertion upwardly through a slot 34' at the lower end of the container 34 so as to align the plate 53 in proper relation within the container 34.

The flow and compensator lines 12 and 13 are preferably composed of a rubber reinforced hose material and are of a length to extend for any desired distance established between the transmitter assembly 11 and the receiver assembly 14. In order to mount the lines securely in relation to the transmitter assembly threaded nipples 56 are disposed at the ends of the lines for engagement in threaded relation with the delivery duct 52 and the compensator duct 54 respectively. Also, a bracket 58 is positioned by means of a threaded screw 58' to hold the lines in clamped relation against a mounting plate 59 which forms a downward extension of the plate 53, to thereby prevent accidental loosening of the connections between the lines and the transmitter assembly over extended periods of operation.

The receiver assembly 14 is shown mounted in housing

H of the recording apparatus, and the recording apparatus in general may be of any standard or conventional type, as mentioned, for recording the various drilling operations. The receiver assembly 14 is mounted in position in the housing by connection to a mounting bracket 60 by a series of cap screws 61, sized for extension through suitable slots or openings 60' in the bracket, and the mounting bracket 60 also serves as a support for arm 62 of the recording pen 15, the arm being pivotally mounted to the bracket by means of a stud 64. The receiver assembly itself is broadly comprised of a series of three cylinders which are operable together to first provide for proper initial setting of the recording pen 15 at the zero position by a manually adjustable or pilot cylinder assembly 66; secondly, to actuate the recording pen arm in response to the delivery of fluid to the receiver assembly by a main cylinder assembly 67; and thirdly, to automatically regulate the receiver in accordance with variations in atmospheric conditions during operation of the assemly such as, by means of a compensator cylinder assembly 68. The pilot cylinder assembly includes a fluid chamber 70 and communicating with the fluid chamber is receiver duct 71 for reception of fluid from the delivery line 12 into the chamber 70. In order to regulate the area within the chamber 70 a manually adjustable piston 72 is threaded through the cylinder assembly and an adjusting knob 73 is provided at its outer end to permit threaded adjustment of the piston relative to the chamber 70 and thus control the amount of fluid which may be stored in the chamber before delivery through a duct 74 into the main cylinder assembly 67. In this way, threaded adjustment of the piston will act upon the fluid to determine the amount of pressure initially applied in the main cylinder assembly and thus control the initial setting of the pen arm 62, preferably at the zero position as illustrated in full in FIGURE 5.

The main cylinder assembly 67 and the compensator cylinder assembly 68 include a common working chamber 75 into which fluid is admitted from the pilot chamber 70. Projecting laterally through one end of the cylinder assembly 67 is an actuating piston rod 76 upon which the fluid acts and as shown the piston rod 76 engages a side plate 77 on the pen arm to control the lateral deflection of the arm and recording pen 15. Thus, as fluid is displaced in the transmitter assembly and caused to flow through the delivery line and into the main cylinder assembly 67, the piston will be caused to move in a direction toward the right and thereby cause lateral deflection of the recording pen in accordance with the amount of fluid displaced. The piston rod 76 is further biased by means of a spring 78 against the force of the fluid so that when for example the weight is lessened upon the leg L of the drill rig causing an increase in length of the leg unit the plunger and piston in the transmitter assembly will tend to return toward the initial, balanced position and the bias of the spring 78 will be sufficient to act upon the fluid causing it to return through the duct 71 and delivery line 12. In order that the pen arm 62 will follow the movement of the piston in a return direction, a follower spring 80 is stretched between the pen arm and top of the cylinder assembly so as to urge the pen arm against the piston 76 at all times and thus establish an accurate recording of variations in weight whether the weight is increasing or decreasing.

In a well known manner the compensator cylinder assembly 68 includes a piston assembly 82 with a diaphragm 83 disposed at its inner end to separate the chamber 75 from the rest of the compensator assembly, together with a diaphragm 84 adjacent the exterior end of the piston which operates to seal off chamber 85, the chamber 85 communicating through an opening 86 with the atmosphere. Essentially, the cylinder assembly 68 merely compensates for the expansion and contraction of the hydraulic fluid due to any temperature variations which may otherwise upset the balanced relation between the transmitter and receiver assembly. The compensator assembly additionally includes a duct 88 connected to the compensator line 13 so as to communicate with the reservoir 55 in the transmitter cylinder 31.

For the purpose of illustration, a typical mode of connecting and balancing the weight recorder W for sensing weight variations applied to the drill rig will be described: Approximately a 40 foot length of the leg unit may be selected, although such length may vary over a wide range, for mounting of the anchor plates 23 and 26 with the tie rod 20 being mounted in parallel spaced relation to the leg unit, and with the plunger 27 properly disposed in biased, slidable relation within the transmitter assembly casing 34. The tie rod may then be adjusted through the turn buckle 22 so as to maintain a strong uniform tension on the tie rod throughout the weight sensing operation. Once the transmitter assembly and receiver assembly are connected and mounted in desired relation to the leg unit and recording apparatus respectively the recording pen 15 may then be balanced by manual adjustment of the knob 73 to control the initial amount of fluid applied against the actuating piston 76 in the main cylinder assembly and thus control the initial setting of the pen 15. In this initial relation it is to be observed that the spring unit 28 will at all times apply a downward force against the plunger, and the piston 30 is biased in a common direction by spring 50; also, the follower spring 80 will similarly apply a force in relation to the working fluid in a direction opposite to the force applied by the spring 28. Actually, the force of the latter spring will be relatively small in comparison to that applied by the springs 28 and 50, and the piston 30 will operate over a larger area to apply a much greater force against the fluid than the actuating piston 76. Accordingly, the force acting upwardly against the lower end of the piston 30 will be substantially less than that of the force acting downwardly through the piston. In this way, any amount of increase in weight, however small, causing even the slightest reduction in length of the leg unit between the anchor plates is translated directly through the plunger 27 and piston 30 to cause the immediate delivery of fluid into the receiver assembly for action directly upon the actuating piston 76. Also, any amount of decrease in weight causing lengthening of the leg of the drill rig will apply increased tension to the tie rod 20 and thereby in turn pull the plunger 27 upwards so as to compress the spring 28 and move the plunger away from the piston 30. At this time, spring 80 of the receiver assembly will exert its full pressure on the plunger 76 forcing it to displace the fluid out of the main cylinder assembly for return through the delivery line into the transmitter assembly and thereby force piston 30 upwards into contact with the new position of the plunger 27. Accordingly, any friction in the system or in the rig itself, and also in the work required initially to cause movement of the plungers and pistons in the system will be overcome by the relatively great initial force of the springs in the system so that any slight changes in length of the leg unit causing even a slight unbalance in the system will immediately actuate the piston in the receiver assembly for lateral deflection of the arm and immediate recording on the chart A.

Greatly increased accuracy, in addition to sensitivity, is provided by the weight recorder of the present invention since in the first place a direct positive connection is established between a relatively rigid member in the form of the tie rod or suitable cable to the leg L of the drill rig so as to be directly responsive to any weight variations absorbed in the form of a downward thrust on the leg unit. In turn, the fluid, which is incompressible, is immediately displaced in response to compression or elongation of the leg unit to cause actuation of the piston 76 and lateral deflection of the pen arm proportional at all times to the hydraulic fluid displaced. Similarly, when weight on the rig is reduced and the length of the leg increases, the pressure of the follower spring 80 will immediately cause the plunger to force the fluid back through the delivery line and thus cause the piston 30 to follow the upward return movement of the plunger against the bias of the spring 28 and thereby keep all backlash or play out of the system. It will also be evident that if desired the traversal of the pen in relation to the movement of the actuating piston 76 may be varied in any suitable manner, for example, by regulating the vertical distance between the actuating piston 76 and stud 64. Thus, for example on small rigs when there is not too much weight on the rig the traversal of the pen may be expanded to full chart width for a relatively slight distance of movement of the piston and thereby provide more detailed records of the variations in weight.

From the foregoing, it is to be understood that the apparatus disclosed herein is merely an example of the preferred embodiment of the present invention and that various changes and modifications are possible in the particular structure without departing from the fundamental principles of the invention, and accordingly the scope of the invention is not to be limited except in accordance with the terms of the appended claims and equivalents thereof.

I claim:

1. Weight recording apparatus adapted to sense and record through a recording instrument variations in drilling weight applied to a drill rig comprising, means connected to a portion of the rig which portion undergoes changes in length in accordance with variations in weight applied to the rig, said means being slidable at one end in relation to the rig and including a plunger movable in response slidable movement of the end of said means caused by changes in length of the portion, a transmitter assembly including a cylinder and a piston disposed for actuation by said plunger for displacing fluid from said cylinder corresponding to the extent of movement of said plunger, said plunger and transmitter piston being biased in the direction of movement of said means caused by an increase in weight on the rig portion, and a receiver assembly including a piston responsive to the fluid displaced from said transmitter for actuating the recording instrument, said receiver piston being biased in a direction generally opposing the bias of said plunger and transmitter piston, an adjustable volume pilot cylinder in said receiver assembly for regulating the initial setting of said receiver piston and means for varying the volume of said pilot cylinder after assembly of said apparatus.

2. Weight recording apparatus adapted to sense and record through a recording instrument variations in drilling weight applied to a drill rig, comprising: first means connected to a portion of the rig which portion undergoes changes in length in accordance with variations in weight applied to the rig, said first means including a plunger movable in response to changes in length of the portion; bias means associated with said plunger biasing it in the direction of movement of said first means caused by an increase in weight applied to the rig portion: a transmitter assembly including a hydraulic cylinder and a piston disposed for actuation by said plunger and being responsive thereto for displacing fluid from the cylinder corresponding to the extent of movement of said plunger; a receiver assembly including a main cylinder and actuating piston responsive to the fluid displaced for actuating the recording instrument in accordance with the amount of fluid displaced so as to correlate the movement of said plunger with the variation in weight necessary to cause such movement; a follower spring interposed between said main cylinder and the recording instrument; a pilot cylinder interposed between said transmitter and receiver assemblies and including means for adjustably regulating the initial displacement of said actuating piston to thereby control the initial setting of the recording instrument.

3. The weight recording apparatus of claim 2 in which said pilot cylinder is connected to said hydraulic cylinder by a duct, said pilot cylinder is provided with an adjustable wall for adjusting its volume and including means for adjusting the position of said adjustable wall to adjust the volume of said pilot cylinder.

References Cited in the file of this patent

UNITED STATES PATENTS

| | | |
|---|---|---|
| 924,427 | Chapman | June 8, 1909 |
| 1,098,931 | Akimoff | June 2, 1914 |
| 1,125,236 | Whiting | Jan. 19, 1915 |
| 1,557,781 | Scott | Oct. 20, 1925 |
| 1,670,124 | Reed | May 15, 1928 |
| 2,225,683 | Carr et al. | Dec. 24, 1940 |
| 2,686,445 | Keck | Aug. 17, 1954 |